April 6, 1965        D. OGNE        3,177,011
NEUTER COUPLING
Filed Feb. 25, 1963
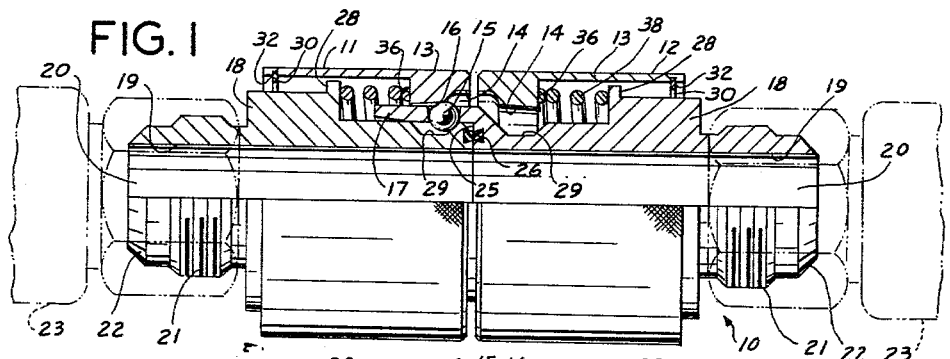
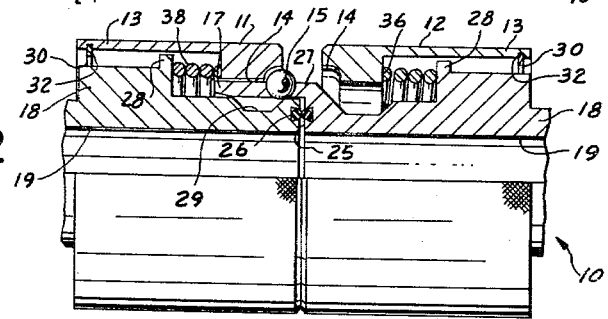
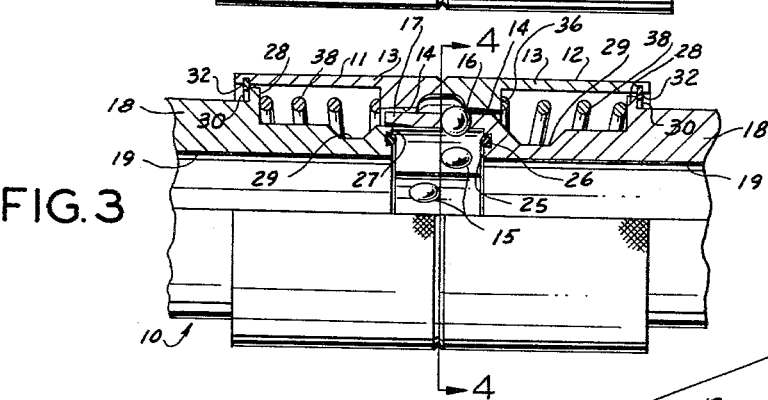
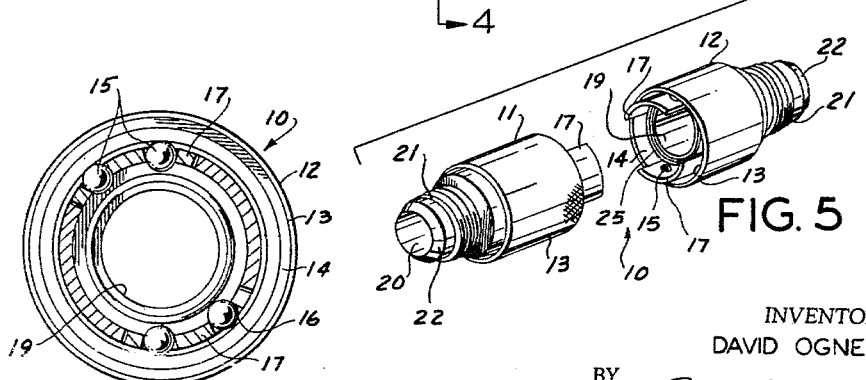
INVENTOR.
DAVID OGNE
BY
R. E. Geauque
ATTORNEY

United States Patent Office 3,177,011
Patented Apr. 6, 1965

3,177,011
NEUTER COUPLING
David Ogne, Northridge, Calif., assignor to Raymond G. Koger, doing business as Cliffko Manufacturing Company, Chatsworth, Calif.
Filed Feb. 25, 1963, Ser. No. 260,719
4 Claims. (Cl. 285—70)

This invention relates to a neuter coupling and more particularly to a modification of the neuter coupling shown and described in patent application Serial No. 215,991, filed August 9, 1962 and now abandoned.

The neuter coupling disclosed in said copending application comprised identical coupling halves, each of which incorporated a knurled nut whose internal threads engaged external threads on a castellated segment of the opposing coupling half. While generally satisfactory, this neuter coupling has the drawback that it is necessary to thread the knurled nut onto the external threads of an opposing coupling half to assemble the halves and to unthread both of the nuts to separate the coupling halves.

It is a primary object of the present invention to provide a neuter coupling of the type disclosed in copending application Serial No. 215,991, which may be readily assembled and disassembled without employing threaded connections, resulting in a truly "quick connect" and "quick disconnect" coupling.

Another object of the present invention is to provide a neuter coupling of the type described wherein separate coupling halves will align themselves when brought into mating relation and will be maintained in mating relation by spherical balls on one half which engage an annular groove on the other half.

Yet another object of the present invention is to provide a neuter coupling wherein separate coupling halves may be brought into mating relation in a manner to afford structurally sound load carrying capacity even though the separate halves are not seated in fluid-tight relation.

A further object of the present invention is to provide a neuter coupling wherein the inside diameter of the coupling is straight and uniform and may correspond in size to that of a hose or tube used with the coupling, whereby flow restrictions and pressure drop across the coupling are eliminated.

According to the present invention, identical coupling halves are each provided with segments which engage the opposing coupling half intermediate the segments thereof in load carrying relationship. Spherical balls are mounted in the segments of each half and a sleeve is provided on each half which has a cam face adapted to force the balls of one half into an annular recess in the opposing half when the individual halves are brought together in mating relation.

The features of the present invention which are believed to be novel are set forth with particularly in the appended claims. The present invention, both as to its organization and manner of operation, together with further objects and advantages thereof, may best be understood by reference to the following description, taken in connection with the accompanying drawings, in which:

FIGURE 1 is a longitudinal view, partly in cross-section, showing identical coupling halves of the present invention connected together in operative relation;

FIGURE 2 is a partial lonigtudinal view, partly in cross-section, showing the coupling of FIGURE 1 at an intermediate step during the assembly thereof;

FIGURE 3 is a view similar to FIGURE 2 showing the coupling halves in another stage during the assembly thereof;

FIGURE 4 is a transverse cross-sectional view taken along line 4—4 of FIGURE 3; and FIGURE 5 is a perspective view of the neuter coupling of the present invention.

Referring again to the drawings, the neuter coupling constituting the present invention, generally designated 10, includes identical coupling halves 11 and 12 each of which incorporates a knurled annular sleeve 13 having an internal cam surface 14 which engages balls 15 held captive in apertures 16 on a castellated segment 17 of the opposing coupling half. Coupling halves 11 and 12 each have two segments 17 which are spaced approximately 180° apart. Each segment 17 is part of a circle approximately 89° so that upon joining coupling halves together, the castellated segments 17 mate. Each coupling half 11 and 12 includes a body portion 18 having an inner, encompasing side wall 19 which is of uniform diameter throughout the length of the coupling half so that it provides an unobstructed flow passage. One end of each coupling half 11 and 12 is of a reduced outside diameter, forms a fluid inlet port 20, carries an external thread 21, and has a tapered end portion 22 so that it may be connected to flared tubing 23 in such a manner that flow will not be restricted at the connection with the tubing. Of course, it is obvious that these ends may be provided with pipe threads or any other suitable connecting means.

Each coupling half 11 and 12 includes a flat face portion 25 in which an O-ring 26 is held captive by means of an annular groove or channel 27. The end of each coupling half adjacent the flat face 25 is undercut to form an annular shoulder 28 and an annular ball-receiving groove 29. The sleeve 13 is mounted on its respective coupling half in a slidable manner and is prevented from sliding off the end thereof by a spiral ring 30 which engages an annular groove 32 in the sleeve 13 and the shoulder 28. Each sleeve 13 also includes an annular shoulder 36 against which one end of a compression spring 38 is seated with its other end bearing against shoulder 28 to bias the sleeve 13 into the position shown in FIGURE 3 wherein the spiral ring 30 engages the shoulder 28. This condition remains while coupling halves are disconnected.

When it is desired to mate the coupling halves 11 and 12 together, the tubing 23 on each coupling half may be grasped and the coupling halves placed together as shown in FIGURE 3. When the coupling halves are then pressed together toward each other, the cam face 14 on each sleeve 13 engages the spherical balls 15 on an opposite coupling half forcing them down into a ball-receiving groove 29, as shown in FIGURE 1.

To disassemble the coupling halves, it is merely necessary to grasp the sleeves 13 and slide each along its repective coupling half toward tubing 23, thereby releasing balls 15 from annular ball-receiving grooves 29.

As shown in FIGURE 2, the O-ring 26 protrudes sufficiently from the face 25 of a coupling half so that the O-ring 26 of one coupling half would be brought into seating relation with the O-ring 26 of the mating coupling half when the two halves are placed together. The segments 17 protrude from the face 25 thereby protecting the seals 26 from damage when the couplings are in their uncoupled condition. The seals 26 are designed to be squeezed together in sealing relation when face 25 of coupling half 11 and face 25 of coupling half 12 are made to contact each other by forcing balls 15 into ball-receiving grooves 29. With the seals 26 in this condition, they are completely trapped within their respective channels 27. Therefore, they cannot "blow out" and their sealing action can be maintained against maximum pressure.

When the coupling halves are coupled together, as shown in FIGURE 1, the compression spring 38 of one coupling half biases its respective sleeve 13 toward the other coupling half, thereby maintaining the cam surface 14 in engagement with the balls 15 so that they will remain seated in the annular ball-receiving grooves 29.

While the particular neuter coupling herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. A neuter coupling comprising:

first and second body portions each having segments extending axially and radially offset from one end thereof, the segments of one of said body portions being adapted to slide between the segments of and to overlap the other of said body portions;

detent means mounted on at least one of said segments on one body portion and engageable with the other of said body portions as said body portions are brought together; and detent receiving means mounted on the other of said body portions for engagement with said detent means when said body portions have been brought together; and means to retain said detent means and receiving means in operative relation.

2. A neuter coupling comprising:

a first body portion having a uniform, internal diameter defining a continuous flow passage and detent receiving means in the external periphery thereof;

castellated segments on one end of said first body portion;

a second body portion having a uniform internal diameter forming a continuous flow passage and external, detent receiving means in the external periphery thereof;

castellated segments on one end of said second body portion, said segments being adapted to slide between the segments of and to overlap said first body portion;

detent means mounted on each of said segments on each of said body portions, the detent means of one body portion being adapted to engage the detent receiving means of another body portion when said body portions are brought together;

a first connecting means slidably mounted on said first body portion and having an internal cam adapted to engage the detent means on said second body portion and move said detent means into engagement with the detent receiving means on said first body portion; and a second connecting means slidably mounted on said second body portion and having an internal cam adapted to engage the detent means on said first body portion and move it into engagement with said detent receiving means on said second body portion.

3. The neuter coupling of claim 2, including an annular channel in said one end of each body portion; an annular O-ring mounted in each channel and protruding therefrom prior to assembly of said coupling; said O-rings engaging each other and being compressed into said channels during assembly.

4. The neuter of claim 2, including a compression spring encompassing each body portion and biasing its connecting means into engagement with the detent means of the other body portion.

References Cited by the Examiner
UNITED STATES PATENTS

| | | | |
|---|---|---|---|
| 974,517 | 11/10 | Revaillot | 285—73 |
| 3,112,767 | 12/63 | Cator | 285—277 |

THOMAS F. CALLAGHAN, *Primary Examiner.*